Patented Jan. 28, 1936

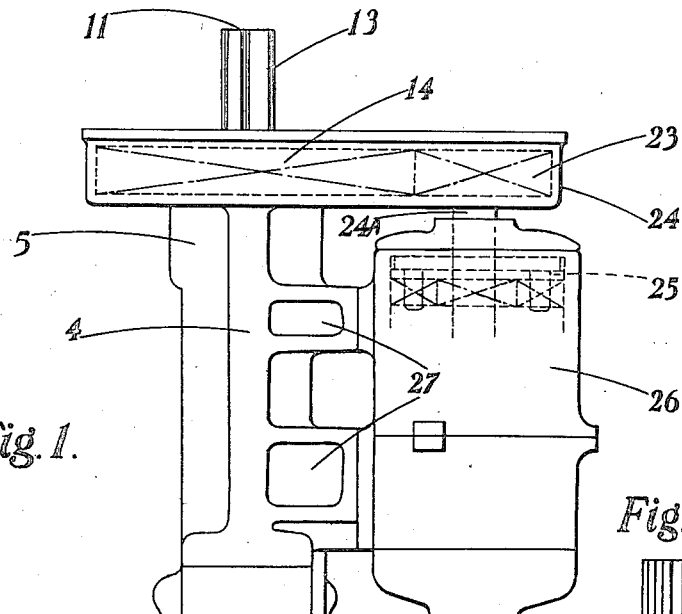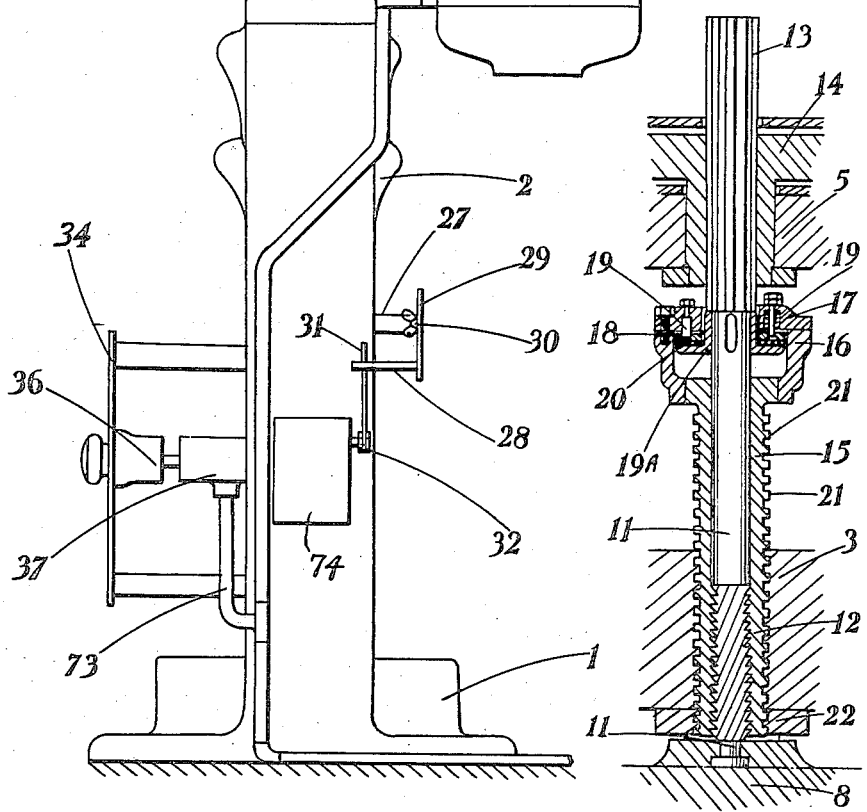

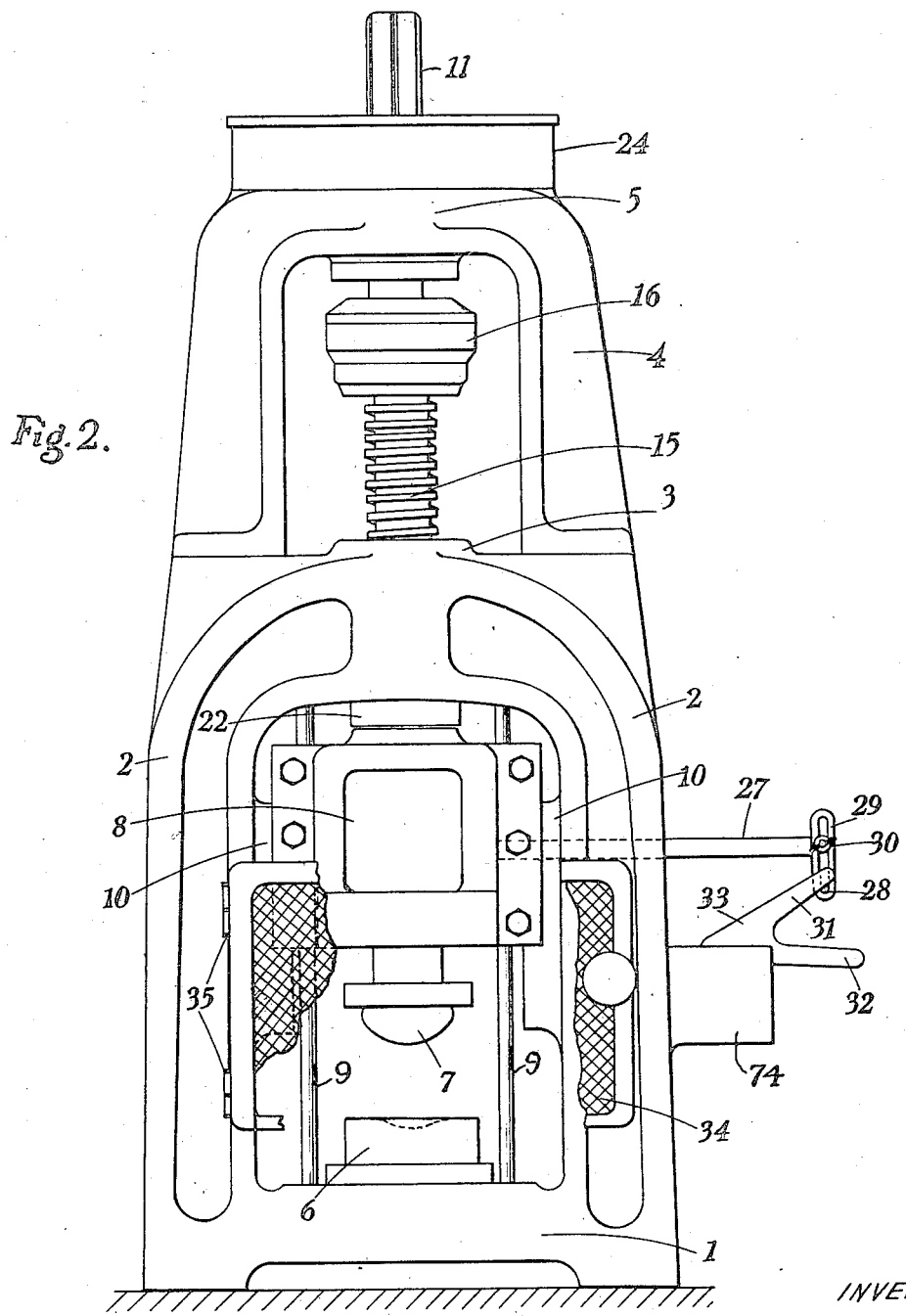

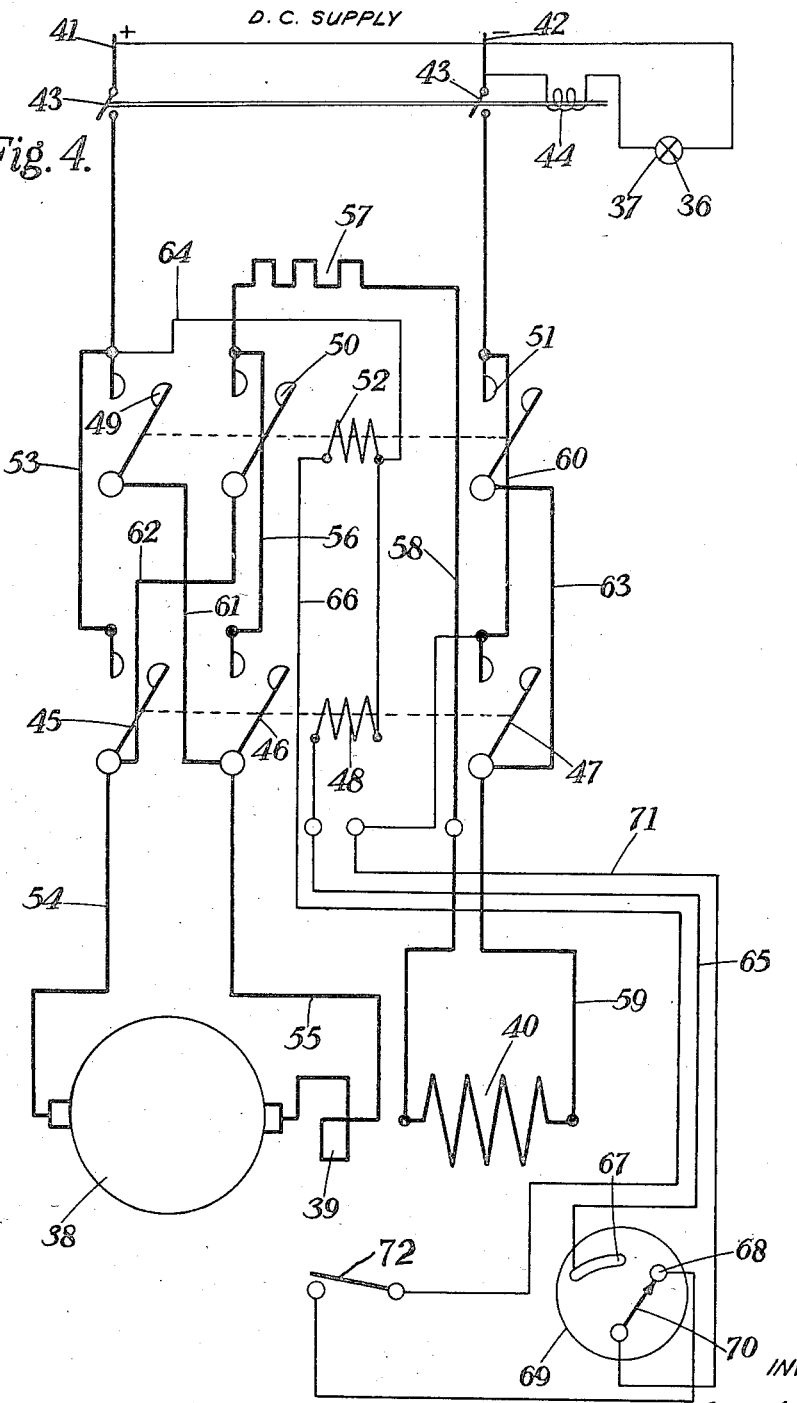

2,029,026

UNITED STATES PATENT OFFICE 2,029,026

PRESS

Rudolph John Kaula, Edgbaston, Birmingham, England, assignor to The General Electric Company Limited, London, England Application July 31, 1934, Serial No. 737,735
In Great Britain August 1, 1933

7 Claims. (Cl. 18—16)

This invention relates to presses and more particularly to presses for moulding plastic material, for example, composition comprising synthetic resin and a suitable filler, under heat and pressure, an object being the provision of improved operating means for expediting or facilitating the working of a press.

A press for moulding plastic material according to the present invention comprises relatively coarse screw threaded means for giving rapid movement before or after a forming operation and further screw threaded means having a finer thread than the first screw-threaded means for exerting pressure during the forming operation in combination with an electric motor for driving the coarse and fine screw threaded means and circuit control means for the motor such that the motor may be maintained in circuit during the forming operation.

In a preferred construction in accordance with the invention, the motor drives through reduction gearing directly on to the fine screw threaded means, which is suitably splined, and friction clutch means are provided between the fine and coarse screw-threaded means, the friction clutch means being rendered inoperative on initial closure of the press.

Preferably also the motor control gear includes time delay means whereby the motor is maintained in circuit for a predetermined period after initial closure of the press.

In one particular arrangement as applied to a press for moulding material denoted by the trade-mark "Bakelite" the screw threaded means include concentric spindles, the outer or hollow spindle being formed with internal and external screw threads, one of the said threads being of relatively coarse pitch and the other of relatively fine pitch.

A stop may be provided which is adapted to limit rotation of the screw threaded means having a relatively coarse pitch thread when rapid movement after a forming operation occurs, for the purpose of ensuring return of the driving part of the screw threaded means having a relatively fine pitch thread to its normal position.

The motor may have series characteristics, i. e., may be such that it exerts its maximum torque when stationary; moreover resistances may be inserted in series with the motor whereby the torque when stationary may be regulated.

Preferably control means are provided for causing the motor automatically to perform a cycle of operations including opening and closing the press at agreed intervals of time.

One arrangement of press particularly suitable for moulding composition comprising synthetic resin and a suitable filler, in accordance with the invention, will now be described, by way of example, with reference to the accompanying diagrammatic drawings, of which Figure 1 shows a side elevation of the press with a part in section, Figure 2 a front elevation with a part cut away to show the cooperating mould-halves, Figure 3 a section on a larger scale of the two driving spindles and the interconnection therebetween, whilst Figure 4 shows the circuit for controlling the motor driving the press.

In the drawings, referring now to Figures 1, 2, and 3, the press comprises a main frame including a base 1 and rigid upstanding arms 2 united in a central boss 3 and further upstanding arms 4 also united in a central boss 5 located vertically above the first mentioned central boss 3.

The stationary portion 6 of the mould is mounted on the base 1. The movable half 7 of the mould is carried on a massive member 8 arranged to slide on vertical rods 9 and carried between the base and the central boss 3 and also on projecting portions 10 of the arms 2 engaging in complementary grooves in the massive member 8.

A spindle 11 is located in the top of the member 8 in such a manner that it can be rotated relatively to the member 8 but is not capable of longitudinal or lateral movement relatively thereto. The spindle 11 is formed towards its lower end, in which it is rooted in member 8, with an external screw thread 12 and in its upper part 13, is splined and extends through a gear wheel 14, by which it is arranged to be rotated.

A hollow shaft 15 surrounds the first-mentioned spindle 11; the internal lower surface of the shaft 15 is threaded to correspond with the threading 12 on the spindle 11. At the upper end of the shaft 15 is carried a clutch housing 16 having a top plate 17 bolted thereto. The inner surface of the top plate 17 carries a steel disc 18 which is biased away from the top plate by springs 19.

The spindle 11 extends through the clutch housing 16, the disc 18 and top plate 17, and carries a clutch half 19A faced with friction material 20 which is arranged to engage the disc 18 and thus to transmit torque from the spindle 11 to the shaft 15.

The external part of the shaft 15 is formed with a thread 21 which corresponds to and cooperates with an internal thread in the boss 3 through which the shaft 15 extends; rotation of the shaft 15 in one or other direction causes a corresponding vertical movement of the shaft 15. The shaft 15, at its lower end, carries a collar 22 which is arranged to act as a limiting stop for upward travel of the shaft 15 by engagement with the undersurface of the boss 3.

The inner spindle 11 is arranged to be driven through the spur gear wheel 14 and corresponding spur gear wheel 23 housed in a gear housing 24. The wheel 23 is driven through a shaft 24A and planetary gearing 25 from a motor 26 carried on sidewardly extending arms 27 from the arms 4. The gear wheels 14 and 23 form a reduction gearing between the motor 26 and the spindle 11.

The operation of the device is as follows: suppose that the mould is open and the press is in the position shown and that the motor 26 is started up (the control of the motor will be hereinafter described), then the friction between the clutch halves constituted by the facing 20 and the disc 18 is such that the drive is transmitted to the outer spindle or shaft 15 from the inner spindle 11. The rotation of the outer shaft 15 causes that shaft and the spindle 11 and thus the block 8 and mould-half 7 to move bodily downwards.

When the mould-halves 6 and 7 engage, i. e. the mould closes, the resistance to movement reaches such a point that the clutch drive between the two spindles commences to slip whereupon the inner spindle 11 moves down relatively to the outer spindle 15 and thus causes a maintenance of the pressure on the mould, which is maintained for a predetermined time.

On now reversing the motor, since there is then no initial driving connection between the inner and outer spindles 11 and 15 respectively, the inner spindle moves up until the clutch halves reengage whereupon the clutch drives the outer spindle 15, together with the inner spindle 11, upwards until the collar 22 engages the underside of the boss 3. A sidewardly moving arm 27 carried by the block 8 carries at its end a finger 28, mounted on a member 29, sliding relatively to the arm 27 and adjusted relatively thereto by a wing-nut 30 arranged to engage one arm 31 of a bifurcated member 33, having a further arm 32.

The member 33 is biassed to a mean position, and is arranged by rotation to operate a limit switch enclosed in housing 74 and connected in the associated motor circuit, so that movement of the member 33 trips the limit switch. It is arranged that on upward movement of the block, the limit switch is tripped before the block has moved an excessive amount upwards and into engagement with the underside of the collar 22.

A guard-door 34 swung on hinges 35 is provided in front of the mould-halves 6 and 7, in order to protect the operator of the press; the opening of the door 34 is arranged to control the motor circuit through a plug 36 and socket 37 device, the plug being carried on the door and the socket on the main frame. The various motor circuit leads are passed through conduit 73.

Referring now to Figure 4, the motor 26 is a direct current series wound machine having an armature 38, a commutating pole winding 39 in series with the armature 38 and a series field winding 40.

The motor is arranged to be supplied from direct current bus bars 41, 42, through the contacts 43 of a no-volt contactor having an operating winding 44 and either through "forward" triple pole direction contactor having pull-on contacts 45, 46 and 47 and an operating winding 48, or through a "reverse" triple pole direction contactor having pull-on contacts 49, 50 and 51, and an operating winding 52.

The closing of "forward" contactor completes a circuit from positive bus 41, through contacts 43 (assuming the no-volt contactor closed) over line 53, contacts 45, line 54, armature 38, commutating pole winding 39, line 55, contacts 46, line 56, series resistance 57, line 58, series field 40, line 59, contacts 47 and line 60 to the negative bus bar 42.

Similarly, the closing of "reverse" contactor completes a circuit from line 41, contacts 43, contacts 49, line 61, line 55, commutating pole winding 39, armature 38, line 54, line 62, contacts 50, series resistance 57, line 58, series field 40, line 59, line 63, contacts 51 to the negative bus bar 42.

The closing of the direction contactors is determined by the completion of circuits through their operating coils 48 or 52. Accordingly the coils 48 and 52 are commoned on one side and connected over a line 64 to the positive bus and over lines 65, 66 to the contacts 67, 68 respectively of a time switch 69, having a moving clockwork controlled element 70 connected over line 71 with the negative bus. The circuit to the reverse contactor coil 52 is completed through contacts 72 operated by the limit mechanism 33 (see Figure 2).

In operation, assuming that a start is made with the mould in the open position, the clock switch 69 is rotated in a counter-clockwise direction. This motion winds the clock mechanism and causes the element 70 to make with contact 67. The circuit for the coil 48 of the forward contactor is thus completed and this contactor closes and energizes the motor to cause the mould to close as previously described.

The clock switch 69 now rotates in a clockwise direction and after an adjustable period, for example, between 10 and 30 seconds, the contact at 67 is broken and the forward contactor then opens thus de-energizing the motor but leaving the mould closed.

After a further period of, for example, between 3 and 7 minutes, the clock switch 69 makes contact at 68 and the reverse contactor then closes, again energizing the motor to open the mould. When the mould is fully open, the limit switch 72 is tripped and the reverse contactor opens and stops the motor.

The operation is then complete and can be repeated as required by the actuation of the time switch.

The circuit to the no-volt contactor coil 44 is completed through the plug 36 and socket 37 associated with the door 34 and thus opening of the door renders the motor inoperative.

During the short adjustable period (e. g. 10 to 30 seconds) slow movement occurs during the forming operation while the moulding material is being finally compressed and until the material definitely sets.

It is, of course, not necessary that a simple direct current series wound motor be used, but it is essential to employ a motor having a series characteristic. For example, an induction motor with a high resistance secondary can be employed, which exerts maximum torque when stationary.

Moreover, where a direct current series wound machine is employed, the pressure exerted by the press can be adjusted by variation of resistance in the motor circuit. For example, the closing of the press may cause resistance to be inserted in the motor circuit.

I claim:—

1. A press for moulding plastic material comprising cooperating mould portions, one of which is movable relative to the other into position for the forming operation, a screw having relatively coarse threads for rapidly moving the movable mould portion before and after a forming operation, a screw having finer threads than the first screw for exerting pressure on the movable mould portion during the forming operation, an electric motor for driving both the coarse and fine screws and circuits including control means for maintaining the motor in circuit during the forming operation.

2. A press for moulding plastic material as in claim 1, wherein the motor is arranged to operate through reduction gearing for directly driving the fine screw and a friction clutch is provided between the fine and coarse screws which is arranged to become inoperative to drive the coarse screw as soon as the pressure after initial closure of the mould exceeds a predetermined amount.

3. A press for moulding plastic material comprising cooperating mould portions one of which is movable relative to the other into positions for the forming operation, a relatively coarse threaded screw and a relatively fine threaded screw for moving said movable mould portion, said coarse threaded screw being adapted for rapid movement of the movable mould portion both before and after a forming operation and said fine threaded screw being adapted for exerting pressure on said movable mould portion during the forming operation, an electric motor arranged for driving said fine threaded screw, a friction clutch between the fine and coarse threaded screws whereby the latter is driven by the former, said clutch being arranged to become inoperative to drive the coarse threaded screw after initial closure of said mould portions while continuing to drive the fine threaded screw and circuits and control means including switching and timing devices arranged to control the motor for automatically carrying through a cycle of operations including movements of the movable mould portion for opening and closing the mould at predetermined intervals and maintaining it closed under pressure of the fine screw during the forming operation.

4. A press for moulding plastic material as in claim 3, wherein said coarse threaded screw is provided with a stop on its lower end for limiting withdrawal rotation of the screw to thereby limit upward movement of the movable mould portion after a forming operation and to insure return of the fine threaded screw to its initial position.

5. A press for moulding plastic material comprising cooperating mould portions one of which is movable relative to the other into position for the forming operation, a coarse threaded screw and a fine threaded screw for moving said movable mould portion, said screws being concentric and connected together by a friction clutch so that rotation of the fine threaded screw will rotate the coarse threaded screw, an electric motor having series characteristics for rotating the fine threaded screw, electric circuits for the motor, operating coil operated switches in the motor circuit for effecting direct and reverse rotation thereof and circuits including a timing switch for operating the respective operating coils in a prearranged cycle.

6. A press for moulding plastic material as in claim 5, wherein the timing switch circuit for the switch for reverse rotation includes a limit switch which is arranged to be opened and closed by said movable mould member at its upper and lower limits of movement.

7. A press for moulding plastic material as in claim 5, wherein safety switches in the main circuits to the motor are arranged to be operated by an operating coil and a safety door for preventing access to the mould members when the motor is operating is provided with switching means in circuit with said operating coil for opening and closing the safety switches when the door is opened and closed.

RUDOLPH JOHN KAULA.